Aug. 8, 1939.  W. R. ALEXANDER  2,168,309
PROCESS FOR DEHYDRATING AN EMULSION
Filed Aug. 2, 1935  2 Sheets-Sheet 1
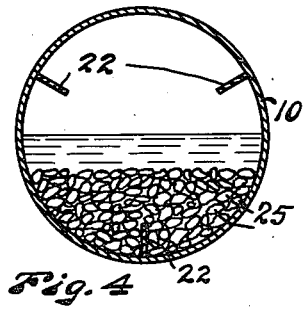
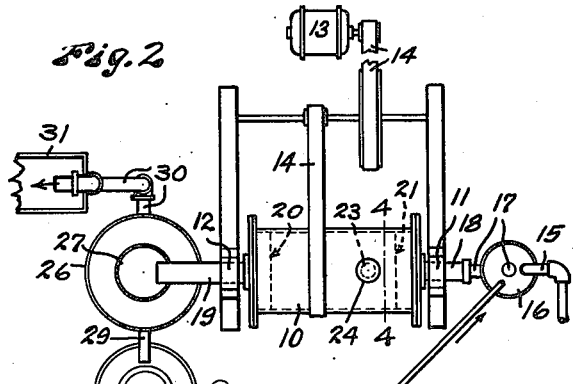
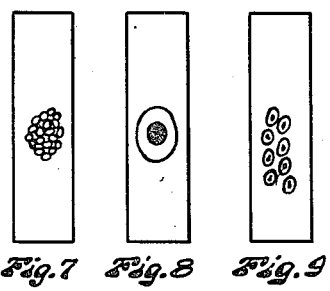
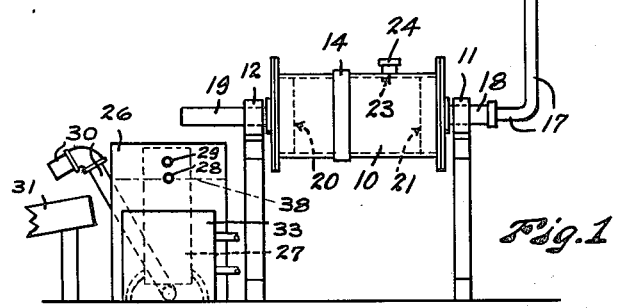
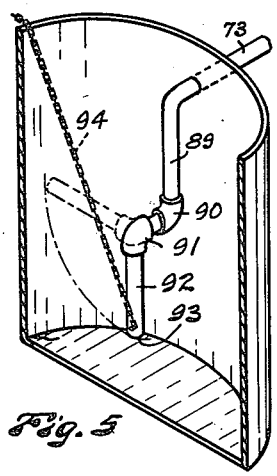
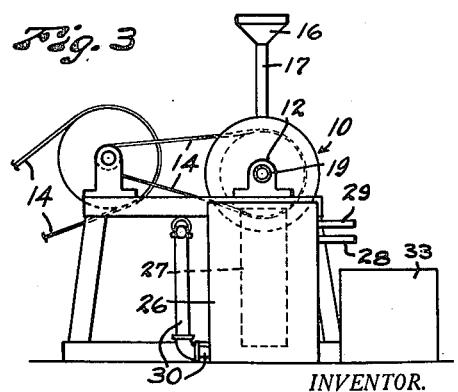
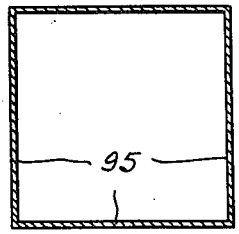
INVENTOR.
Walter R. Alexander
BY
ATTORNEY

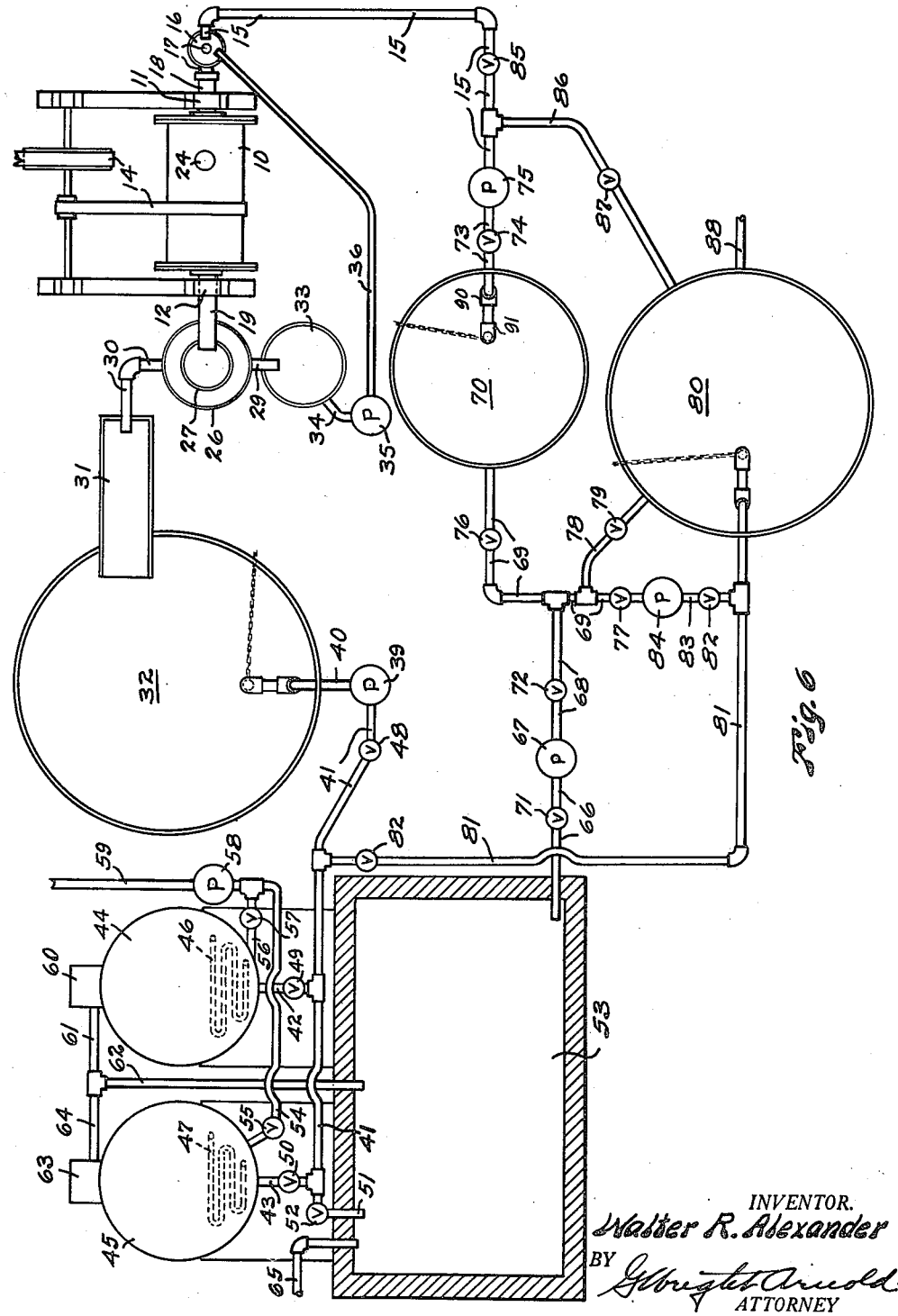

Patented Aug. 8, 1939

2,168,309

UNITED STATES PATENT OFFICE 2,168,309

PROCESS FOR DEHYDRATING AN EMULSION

Walter R. Alexander, Seattle, Wash.

Application August 2, 1935, Serial No. 34,388

3 Claims. (Cl. 196—4)

My invention relates to a process for dehydrating an emulsion. More particularly, my invention relates to the process of dehydrating an oil or a tar, or an oil and tar emulsion.

One large source of tar emulsion is a by-product in the manufacture of artificial gas by the water gas process. As this emulsion as a gas plant by-product is produced at the rate of fifteen thousand gallons per day in a plant manufacturing six million cubic feet of gas per day, the disposal of such emulsion is a problem, and it is a primary object of my invention to dehydrate the emulsion in order that the tar or asphalt constituents of the emulsion may serve as a fuel of a character which may be burned with a high degree of efficiency upon atomization in the boiler furnaces of the plant. That is, my purpose is to transform the by-product from a liability to an asset. Obviously, the less water present in the tar at the time of burning, the less is the percentage of the fuel necessary to be wasted in eliminating the water of the emulsion and the more efficient is the use of said tar as a fuel. Instead of being used as a fuel, it will be understood that the dehydrated tar, after treatment by my process, may be used for the usual purpose to which tar is ordinarily put, particularly when the emulsion is one having a low free carbon content.

In the manufacture of carbureted water gas for use as a fuel for domestic and industrial purposes, it is the practice to enrich the blue gas as it passes from the generator to the carburetor part of what is known as the water gas set. This enriching is accomplished by the introduction of a suitable oil (frequently Diesel, fuel, naphtha and gas oils, etc., are used). In certain sections of the country the oil used for said enriching purposes produces a great deal more free carbon after passing through the carburetor and superheater parts of the gas set than do the said enriching oils from other parts of the country. This free carbon influences very greatly the degree of emulsification that is found in the wash box and condensing parts of the water gas system. According to the theory presently held, the said free carbon, together with the uncracked oil part of the enriching oil, is the active emulsifying agent. At least it is known that the greater the amount of the free carbon that is found in the emulsion after it is separated from the gas, the more difficult is the emulsion to dehydrate.

The general object of the present invention is to provide for the dehydration of said tar emulsion and particularly of a tar emulsion having a high percent of carbon. The amount of free carbon present in these tar emulsions varies from 5% to 30% in round figures. In general, the tar emulsion treated by the process of my invention and herein set forth involved about 25% free carbon.

The tar emulsion resulting as a by-product in formation of artificial gas, as above described, is characterized by having the tar in continuous phase,—the water being in discontinuous phase, i. e., the tar entraps or entrains said water. Where the amount of free carbon present in the emulsion is relatively small, the practice has been to heat the emulsion and thereby accomplish dehydration to a large degree, the heat causing steam within the droplet and thereby causes a breaking of the tar envelope. While such a procedure may be feasible where the percent of free carbon is small, nevertheless, the practicability of such a procedure decreases as the percentage of carbon increases. The carbon emulsion with the higher percentages of free carbon present constitutes a particularly obstinate and difficult emulsion to dehydrate. Heating the emulsion as above suggested has a bad effect in that it drives off the lighter or more volatile oils that may be present in the emulsion in the form of gases having a disagreeable odor, thereby not only reducing the B. t. u. value of the tar for fuel purposes, but such heating affords grounds for complaint from the surrounding residential district, and where the plant is located remotely from a residential section, said gases may be carried by the wind to such districts. It will be understood that the odor emitted upon heating the emulsion is characterized by being particularly pungent and obnoxious.

In the case of oil emulsions or such tar emulsions where the water is in continuous phase instead of the tar being in continuous phase, the process of dehydrating by means of passing an electric current through the emulsion operates fairly satisfactorily but obviously, the passing of such electric current is not possible where the continuous phase is tar rather than water, as the tar is not a conductor.

In view of the above facts in a plant on the Pacific Coast, producing about six million cubic feet of gas per day, there is formed, as a by-product, a tar emulsion at the rate of about fifteen thousand gallons per day. This tar emulsion is characterized by a free carbon content of about 25% and so obstinate to dehydration is this emulsion that in the first place, instead of dehydrating, the practice was to mix sawdust with the emulsion and then burn the same in the boiler furnaces. So obnoxious was this to nearby residents that it was stopped upon complaint. Then the attempt to dehydrate by heating was employed, but serious objection occurred, due to the above mentioned development of pungent odors and this likewise was stopped upon complaint.

Before the present invention was developed, it was necessary to barge the emulsion twenty miles out from shore and dump the same into the ocean as one means of reducing the quantity of the emulsion upon the occasion of an emergency. Such dumping of the emulsion involved not only the great cost of barging, but also the loss of the tar as a fuel.

I have discovered how to dehydrate said tar and to do so economically and to carry such dehydration to the point where such product can be efficiently used as a fuel.

For purposes of illustration and definiteness of description, I will describe my invention as applied to the particular problem of dehydrating the particular emulsion resulting from the manufacture of artificial gas where asphalt fuel oils were employed as the enriching oils. Also where such tar emulsion was characterized by having the relatively high free carbon content of 25%, as set forth above, and a 59% to 74% water content.

Also I will set forth my invention as applied to other tar emulsions where the free carbon content was 5%. The oil emulsion thus produced was derived where an asphalt Diesel oil was employed as the enriching oil. It will be understood that the Diesel asphalt oil is considerably more costly than the asphalt fuel oil. It is to be understood that my invention is not to be limited to any such specific applications, but is to extend to all instances where like problems and conditions obtain in whole or in part.

The separating of the tar from the entrapped water is facilitated by increasing the discrepancy between the viscosity of the tar envelope and the entrapped water. Where the temperature is low the viscosity of the tar is high. Increasing the temperature lowers the viscosity of the tar. The viscosity of the water at the low temperature is relatively much lower than the tar. Change in temperature effects very slightly the viscosity of the water, while as indicated above, heating greatly decreases the viscosity of the tar.

While the heating changes the viscosity of the tar and brings it more near to that of the water, so that at the higher temperatures the emulsion is more readily dehydrated within certain limits, obviously the necessity of heating beyond certain points greatly increases the cost of dehydration.

The tar emulsion as formed varies in temperature from 100 to 180° F., and therefore, any dehydrating process which undertakes to treat the emulsion at or near 100° F. may proceed without the expense of reheating.

A primary purpose of my invention is to provide a process of treatment which also meets this requirement.

Also, it is my purpose to provide a dehydrating process which may be continuous in operation as contrasted with batch treatment.

The above mentioned general objects of my invention, together with others inherent in the same, are attained by the device illustrated in the following drawings, the same being preferred exemplary forms of embodiment of my invention, throughout which drawings like reference numerals indicate like parts:

Figure 1 is a view in elevation of the device embodying my invention, more or less diagrammatically;

Fig. 2 is a plan view of the said device;

Fig. 3 is an end view in elevation of the same;

Fig. 4 is an enlarged view in cross section on line 4—4 of Figure 1;

Fig. 5 is a view in perspective of the gathering emulsion well, parts being shown in cross section;

Fig. 6 is a diagrammatic plan view illustrating the connections of the dehydrating means of my invention with the tar and Fig. 7 is a view of a microscopic slide illustrating a small portion of the tar emulsion;

Fig. 8 is a similar slide showing a small portion of the emulsion which has been treated with the alkaline reagent of my invention;

Fig. 9 is a similar slide showing a small portion of the emulsion which has been treated with sodium hydroxide; and Fig. 10 is a view in section of a modified form of drum embodying my invention.

I provide a drum 10 rotatably mounted in bearings 11 and 12. A motor 13 and belts 14 may serve as a source of power and means for rotating the said drum. The tar emulsion to be treated may be conveyed by pipe 15 into a funnel 16 mounted on inlet conduit pipe 17. This inlet pipe 17 passes through the center of the bearing 11 provided with a stuffing box 18 of standard type. Similarly outlet means 19 extends through the bearing 12, preferably without a stuffing box. Thus, as outlet means 17 is fixedly mounted on the drum, it imparts a whirling motion to the fluids as they emerge from the drum, thereby adding in the intermixing of the liquids. Inside of the drum 10 at each end portion thereof, is provided transversely disposed screen means 20 and 21 which may be in the form of perforated disks. Between said screens are radially directed flanges 22, preferably 3 in number. A port 23 closed by cap 24 provides for direct access to the central portion of the drum. In the space between the drums I preferably place mixing bodies 25. Preferably these bodies consist of ordinary gravel, comprising stones of various sizes and these are preferably not less than one-fourth of an inch in one dimension and not larger than two inches as one dimension. Instead of gravel there may be substituted bodies of similar size of uniform diameter formed of material which is not water repellent but water attractive, so that the surfaces are readily wetted and facilitate the coalescing of small bead-like particles of water into larger droplets of water. Such bodies might be iron bolts or nuts, steel punchings, or small cast iron bolts. Also, such bodies could be formed of refractory material. These small bodies in every instance must be of greater specific gravity than the tar emulsion so as to cause them to fall therethrough upon turning of the drum. Beneath outlet means 19 a separator tank 26 is provided with an axially disposed cylinder 27 which is mounted in spaced relation with the bottom of separator tank 26. Tank 26 may have outlet pipes 28 and 29 (see Fig. 3). The drum 10, instead of being rounded, could have rectilinear sides, i. e., could be square, cross sectionally considered (see Fig. 10).

An inclined relatively large outlet pipe 30 is mounted in communication with the bottom of separator tank 26. This outlet pipe 30 may discharge into trough 31 which may lead to a settling well 32 (see Fig. 6). Beneath outlet pipes 28 and 29 there is located mixing tank 33. From the bottom of this mixing tank 33 an outlet pipe 34 leads to pump 35, which in turn is connected by pipe 36 to funnel 16. A steam pipe 37, or other suitable heating means may be provided within tank 33 for heating the liquids in tank 33, whereby the temperature of said liquids may be controlled. The above constitutes a description of the dehydrating device embodying my invention.

The mode of operation of the device is as follows: The tar emulsion after being conveyed by pipe 15 to funnel 16 is there supplied with an alkaline reagent by means of pipe 36. The combination of the tar emulsion and the alkaline reagent will hereinafter be referred to as the mixture. The tar emulsion and the alkaline reagent may be and preferably are partially mixed by introducing the reagent to the tar emulsion in the pipe 17 through which the tar is directly introduced to the drum 10. The mixture is thus introduced into the end portion of the drum 10 in front of the screen 20. From this end portion of the drum the mixture is introduced through the screen 20 to the central portion of the drum which is about one-third filled with small bodies or gravel. Hereinafter this element will be referred to as gravel. The flanges 22 pick up the gravel and the peripheral portion of the mixture and cascade the same into the bulk of the mixture in the drum.

As the gravel is thus caused to impinge and fall through the mixture, the tar emulsion and the alkaline reagent are thoroughly intermixed and the dehydrating process is commenced. The action of the alkaline reagent affects the tar constituent of the mixture so that said tar has little attraction for the sides of the drum and for the water which it contains in each droplet of the tar emulsion. As a result, the tar droplets or particles are broken down by said alkaline reagent functioning in cooperation with the small bodies or gravel falling therethrough and the water within the droplets is released. The liquid contents of the drum (now consisting of (1) tar, (2) freed water, (3) alkaline reagent, (4) tar emulsion) next flow through pipe 19 into the axially disposed cylinder 27. The dehydration of the emulsion (consisting of a water content of 59 to 74%) has proceeded to the extent that the emulsion now comprises a water content of about 25% (when the machine is working at high efficiency) and to a water content of about 39.5% (when the machine and process are working at poor efficiency, the efficiency depending upon the adding of sufficient alkaline reagent. The liquids from pipe 19 flow into cylinder 27 and thence into drum 26 through the open bottom of cylinder 27. As the level of the liquids rises in both the cylinder 27 and the drum 26, the freed water part and the alkaline reagent part of the liquids, being of a lesser specific gravity than the tar part of the liquids, assume a level above the said tar part. When the flow of the liquids has continued until the cylinder 27 is filled to near its top, the tar thus separated by gravity occupies a level about 2/3 the height of the drum 26, i. e., to a level 38. Since there is the weight of the liquids in cylinder 27 extending above level 38 near the top of cylinder 27, there is a hydrostatic pressure upon the tar constituent of said liquids which forces the tar up pipe 30 and into trough 31 which leads to settling well 32 where additional separation by gravity takes place. Obviously, by adjusting pipe 30 towards or from the vertical position the level of the tar within the tank 26 may be controlled.

The freed water or water derived by dehydration from the tar emulsion plus the partially spent alkaline reagent then flows from tank 26 through pipe 28 or 29 into drum 33. To the partially spent solution and freed water in this drum may be added further fresh alkaline reagent to restore the alkaline reagent to the desired strength. It will be understood that the freed water and the partially spent solution are above normal or ordinary atmosphere temperature when reaching mixing tank 33 and that therein by means of steam coils 37 the temperature is even further raised, if necessary, to the desired temperature which is ordinarily from 110 to 150° F. It will be understood that this is substantially the temperature of the emulsion introduced into funnel 16.

The above described tank 26, cylinder 27 and associated pipe 30 are to be considered as forming one type of separating means. Other separating devices may be employed.

The purpose of utilizing this separating tank 26 and associated means is to make possible the repeated use of the partially spent alkaline reagent or solution diluted with the freed water. If it is not desired to so repeat the use of such reagent or solution, the liquid from the drum 10 could be conducted directly to the settling tank or well 32.

In the above, that portion of the solution diluted with the water, which is not necessary for supplying the necessary amount of solution to the tar emulsion before its introduction into drum 10, is allowed to flow under the above arrangement to the settling tank or well. The settling well 32 further provides for a long time gravity separation which reduces the water content of the tar as much as an additional 10%, i. e., from 25 to 15% or 39.5% to about 29.5%.

The tar thus separated out in the settling tank 32 is then forced by pump 39 through conduits 40 and 41 and branch conduits 42 and 43 to closed fuel tar storage tanks 44 and 45, which tanks may have a capacity of 10,000 gallons each. The temperature of the contents of tanks 44 and 45 is maintained at about 180° by means of steam coils 46 and 47. Conduit 41 may be provided with a valve 48 and branch 42 with valve 49 and branch 43 with valve 50. Within tanks 44 and 45 additional separation takes place to the extent of about another additional 10%, so that the water content is reduced from 15 to 5% or 29.5% to about 19.5%. From conduit 41 a drain pipe 51, having valve 52, leads to separator and circulating well 53.

Also from storage tank 45 a conduit 54, having valve 55, leads to conduit 56 which communicates with tank 44. Conduit 56 has a valve 57. Pump 58 communicates with pipe 56 to pump the tar through pipe 59 from the bottom of tanks 44 and 45 to the atomizing means of the boiler furnaces not shown.

It will be understood that at 180° F. the specific gravity of tar and water are about the same.

The heating of the emulsion in tanks 44 and 45 serves two functions. First, it aids the gravity separation, and second, it renders the tar of a constituency or viscosity suitable for proper atomization when pumped to the furnaces. Each of tanks 44 and 45 is preferably of a capacity to supply sufficient fuel to operate the boiler furnaces of the gas manufacturing plant for 24 hours, each being used alternately, and in the meantime, gravity separation being allowed to continue over a period of 24 hours in the unused tank. In the beginning both tanks 44 and 45 are filled with the separated-out tar from settling well 32 by pump 39. Heat is then supplied to the contents of the tank by suitable heating means, such as the steam heating coils 46 and 47, or other suitable heating means until the temperature of the contents is raised to about 180° F. The heating is thermostatically controlled so as not to let the temperature of the contents of the fuel tar tanks rise above 180° F. After said tanks 44 and 45 are filled, valves 49 and 50 are closed, and after being heated, they are allowed to stand for some 24 hours, during which time there is the above described further gravity separation. At about the end of the 24 hour period, valve 57 is opened, if the contents of tank 44 are to be used for fuel purposes, and the tar part is then pumped for a period of 24 hours to the atomizing means of the boiler furnaces. At the end of 24 hours valve 57 is closed and valve 55 opened so that the pump 58 may then draw upon tank 45 as the source of the tar to be supplied to the atomizing means of the boiler furnaces. Tank 44 is then refilled by opening valves 49 and operating pump 39. By thus introducing the liquids from the settling well into tank 44 the water, which is separated out of the tar by heating and by gravity, may be expelled through dome 60 and conduit 61 and 62 to separator and circulating well 53. Likewise, the water in tank 45 is expelled through dome 63 and conduit 64.

The tar emulsion, as it is originally formed in the wash box, scrubber and condenser parts of the water gas system (not shown), is introduced through pipe 65 into separator and circulating well 53. The said tar emulsion, together with the dehydrated water separated out by gravity and heat in storage tanks 44 and 45 and introduced into tank 53 through conduit 62 is drained through pipe 66 by pump 67 and forced through pipe 68 to pipe 69 into gathering emulsion well 70. Pipe 66 may have valve 71 and pipe 68 may have valve 72. From well 70 the emulsion with the said dehydrated water is drained by pipe 73, having valve 74, by pump 75 and forced through pipe 15 to funnel 16. Pipe 69 is provided with valves 76 and 77. Pipe 78 is provided with valve 79. When gathering emulsion well 70 is filled with emulsion, additional emulsion, together with the water which has separated out, is pumped into relief holder tank 80, valve 79 being opened and valves 76 and 77 being closed.

The water from dehydration which separated out in settling tank 32 may be conveyed by means of an adjustable suction means connected to pipe 40 (hereinafter explained), through pump 39, pipe 41 to pipe 81 having valve 82 and thence to relief holder 80. When it is desired to remove the emulsion from relief holder 80 to the gathering emulsion well 70, valve 82 in pipe 83 is opened and pump 84 operated to force the emulsion through pipe 69 to well 70, valves 76 and 77 being opened and valve 72 being closed.

Another contingency may arise when it is desired to pump the water which settles out by gravity in settling well 32 to separator and circulating well 53. To do this, valve 48 is opened, valve 82 is closed and valves 49 and 50 are closed and valve 52 opened. Then by operating pump 39 it is manifest that said water may be pumped directly to separator and circulating well 53.

Another contingency which may arise is, it may be desired to pump the water, which is separated out by gravity in gathering emulsion well 70, into relief holder 80. Pipe 15 is provided with valve 85. Pipe 86 is provided with valve 87. Accordingly, valve 85 is closed and valve 87 opened. Pump 75 is then operated, and by adjustable suction means, hereinafter described, the water from the upper portion in gathering emulsion well 70 may be then pumped direct to relief holder 80. It may be desirable to remove a part of the water which is separated out from the emulsion by gravity in relief holder 80 to the sewer. To do this, overflow pipe 88 is provided in the upper portion of relief holder 80 and the said water is then drained directly to the sewer.

The adjustable suction means, which is provided in tanks 32, 70 and 80, will now be described (see Fig. 5). Taking gathering well 70, for purposes of illustration, pipe 73 is connected to a vertically disposed section 89, which has swinging joints 90 and 91, which joints are located about midway of the depth of the tank. To joint 91 is secured pipe section 92 which has its inlet end 93 disposed near the bottom of the tank. To this end portion 93 there is secured a chain 94 by means of which section 92 may be swung to different levels within the tank. This provides for taking off the liquids at different elevations.

It will be understood that the water, which separates out by gravity in the various tanks above enumerated, such as 32, 44, 45, 53, 70 and 80, all have an alkaline reaction. I have discovered that it is a decided advantage to use the alkaline water resulting from the dehydrating process of my invention for the use in the scrubber condensing and circulating system of the water gas system. The use of this alkaline water I find produces an emulsion having a much less viscosity and also an emulsion which has much less water entrapped or entrained thereby. My dehydrating process and the use of the alkaline water resulting therefrom has an accumulative effect in the system as a whole which manifestly aids in the dehydrating necessary in the drum 10 and ensuing treatment with the alkaline reagent.

I have discovered that the intermixing of the alkaline reagent or solution and the tar emulsion is a matter of critical importance.

Mechanical mixing devices in the form of beaters with blades, propellers, centrifugal pumps, proportional pumps and geared pumps have been tried, but when used and operated at their normal rates of revolution, they are too violent in their agitation and chiefly operate to beat air into the emulsion and to subdivide the emulsion into small bodies of tar, but still embrace the water within the tar emulsion. By thus beating air into the emulsion, its specific gravity is changed and it will float upon the water and is still more difficult to handle and dehydrate. When said devices above noted are operated at a slower speed than that for which they are designed, they are still much less effective than the means consisting of the falling bodies and drum herein described. Pumping the emulsion through a pipe provided with a screw or worm form of fixed partition to impart a whirling motion is likewise not as effective as the means herein described. The ordinary method of operation of these devices is very rapid and when so operated were not successful. The action of the gravel or small bodies supplied was necessarily slow in operation and the falling of the small bodies, represented by the gravel, provided very accurately the desired degree of agitation, both for the necessary intermixing of the solution with the tar emulsion and for the separation of the water from the tar emulsion. If the mechanical devices above named are operated sufficiently slow they may be employed, but with much less efficiency than means herein set forth.

The scientific explanation of my discovery is not positively known, but my extended experiments suggest the following as the best explanation now known to me.

The action of the alkaline reagent or solution of my invention seems to be such as to break down the surface tension of the tar. Both the cohesive and adhesive character of the tar seems to be affected by said alkaline reagent, so that the particles of water contained within the enveloping tar are released. Since the tar by the action of the alkaline reagent of my discovery loses its attraction for the water, and the water is gradually released in small particles by the chemical solution, the water then is more strongly attracted to the body falling therethrough, represented, in the specific instance herein described, by the gravel, than is said water attracted to the tar. In this wise the small particles of water are gradually collected and coalesced into a droplet of sufficient size to cause its buoyant action within the body of the tar to cause it to float to the top and separate by gravity from the body of the tar. Such floating of the water droplets may be likened to the rising of a balloon into the air under atmospheric pressure.

It is thus manifest that it is highly important that the agitation include the time element to permit the falling of the bodies through the mixture of the emulsion and the alkaline reagent. This time element provides for the intermixing means to collect the particles of water into a droplet of sufficient size to cause it to overcome the confining effect of the viscous tar emulsion and cause its buoyance to overcome the mass and specific gravity of the tar and float to the top. Whatever the theoretical explanation may be, the process and apparatus herein set forth has been proven to operate most efficiently under actual gas production conditions in a Pacific Coast plant producing about six million cubic feet of gas per twenty-four hours. The rate of turning of the drum 10 I find should be about 40 R. P. M. when the same is thirty-nine inches long and about twenty inches in diameter. For this size drum the rate of flow of the emulsion is about 1,000 gallons per hour. The specific gravity of this emulsion at 70° F. is about 1.106. It will be understood, of course, that the speed of the drum 10 varies with the size of the drum. For a mill 6′ 3″ long and 24″ in diameter I find 60 R. P. M. to be the proper speed. The rate of flow of the emulsion, exclusive of the alkaline reagent through this mill is about two thousand gallons maximum per hour. This large mill requires more power to operate and I find that it is not as efficient as the smaller mill above described. Accordingly, if a greater capacity is desired, it would be preferable to add additional smaller units. Such speed will also vary with the character of the emulsion. The greater the specific gravity, the slower the speed. In other words, the most efficient speed for any specific size machine and specific tar emulsion may readily be determined by a test, well within the knowledge of those skilled in the art, of a particular emulsion. In making such tests, the one prime consideration is that the speed must be such as to permit the falling or cascading of the small bodies into the mixture of the solution or tar emulsion. The revolutions per minute must not be so fast as to prevent the cascading or falling out of the bodies through the emulsion and permit of such bodies functioning by way of coalescing the small particles of water released by the chemical reaction into larger droplets, whereby they will be caused to float to the top of the tar emulsion.

In determining the degree of agitation, of course the amount of the gravel is an important matter. This may be readily determined by preliminary tests. For the above indicated sizes of drum and tar emulsion of specified character I find that filling the drum about ⅓ full of gravel of ¼ to 2″ dimension works successfully. If there is too much gravel present, obviously the said cascading of the small bodies could not take place, and if there is too little gravel, there is not sufficient cascading to provide for the necessary number of small bodies falling through the emulsion functioning as coalescing agents.

Thus I have set forth the prime factors governing any preliminary tests to determine the rate of revolutions and the amount of gravel which should be present for a particular size of machine and any particular tar emulsion to be treated.

Also I find that the matter of temperature of the mixture is important (tar emulsion and alkaline reagent or solution). The temperature of the emulsion varies and accordingly, it is important to have it raised to the most efficient temperature for treating which I find, for the emulsion herein employed for describing the invention, to be from 100° F. to 150° F. Accordingly, I preferably provide for a thermostat steam heating coil means 37 in the mixing tank 33. By thus controlling the temperature of the alkaline reagent or solution I directly control the temperature of the mixture. Some emulsions are treated best at about 95° F. and others at about 200° F. The governing consideration in this connection is that temperature is preferably such as to change the viscosity of the tar constituent of the emulsion to lower it to approximately as near as possible the viscosity of the water. Under such conditions the tar envelope holding the water is more readily broken and the confined water more readily released.

In carrying out my invention I find, in preparing the alkaline reagent, that a very efficient chemical detergent composition, purchasable on the general market, is one having the following analysis:

| | Per cent |
|---|---|
| Trisodium phosphate | 9.93 |
| Soap, whose acids have a titer of about 40° C. to 42° C. | 30.65 |
| Sodium carbonate | 30.90 |
| Starch | 6.40 |
| Moisture | 22.12 |

This composition I find goes into solution very readily, even at relatively low temperatures. In preparing the alkaline reagent or solution to be added to the tar emulsion in accordance with the process of my invention from the above, I use the following formula:

Formula 1

Solution:
 The above detergent (by weight) per cent__ 3
 Water _____do____ 97
To this solution add
 Ammoniacal liquors_____gallons__ 3

The above formula is prepared by forming a solution of the said detergent composition 3% and water 97%. (The above figures are by weight.) To this solution is added three gallons of ammoniacal liquors, said liquors being a by-product resulting in the manufacture of coal gas. Such ammoniacal liquors are weak, called "3 oz. strength." In general, these ammoniacal liquors comprise ammonia, phenol compounds and a trace of light oils. I find it to be highly important to have the chemical compound well prepared and intermixed. In other words, it is best to have the soap dissolve the trisodium phosphate during the preparation of the detergent composition. The titer of the soap should be high, as a low titer soap has not been found to work nearly as efficiently. The starch and sodium carbonate, so far as the dehydrating is concerned, seem to play little or no part. However, it is thought that at least the starch plays a beneficial part when the dehydrated water resulting from the treatment of the tar emulsion with the alkaline reagent is employed in the wash or scrubber boxes and condensation system of the gas plant system. Moreover, it is found that it is important that the soap should be one which is characterized by readily jellying.

By considering only, in the above detergent composition of Formula 1, the soap and the trisodium phosphate, there would be present about 64% of the soap and about 36% of the trisodium phosphate. The above formula is added to the tar emulsion just before it enters the drum 10—most efficient when the temperature of the mixture is about 125° F. (tar emulsion and alkaline reagent). This formula, when the machine and process were working at high efficiency, reduced the water content from 59 to 74% water to about 25% water content, and when working at poor efficiency to 39.5%. The difference in efficiency results when the concentration or the temperature of the alkaline reagent of Formula 1 is not maintained, or the temperature is not maintained.

A ready operating test which may be depended upon as indicating whether or not the solution is in the proper concentration, is to note whether or not the liquids issuing from the drum through pipe 19 have a small degree of suds formed. If such suds are present, it may be ordinarily safely relied upon that the process and machine are working at satisfactory efficiency.

On the capacity of the equipment described herein, with the smaller unit the detergent composition is added to the drum 33 to the extent of about one pound every five minutes, and the ammoniacal liquors are added to the extent of about three gallons every five minutes (by weight about seventy-five pounds). This rate of adding these chemicals was when the rate of flow of the tar emulsion throught the drum was about nine hundred gallons per hour. To indicate the efficiency of Formula 1, it may be noted that I found one pound treats about eighty-three gallons of the emulsion, whereas, one pound of ordinary animal soap treats only about ten gallons of the emulsion. This provides a general working arrangement, of which a more exact computation is specific herein above.

Another formula is as follows:

Formula 2

|  | Per cent |
|---|---|
| Sodium tallow soap having a titer of 40° C. to 42° C. | 1.75 |
| Trisodium phosphate | .35 |
| Ammonia liquor | 10 |

The above mixture, plus the required water to make 100% reduced the water content of the emulsion to 29%.

Formula 3

|  | Per cent |
|---|---|
| Cresol solution | 10 |

Cresol consisted of a mixture of 50% cresylic acid and 50% rosin potash soap solution. The soap solution comprised 40% of said soap and 60% water. To the cresol solution, to the extent of 10%, was added water to the extent of 90%. 50 cc. of the 10% cresol solution, together with 100 grams of tar emulsion at 125° F. reduces the water content of the emulsion to 19.5%. This mixture was efficient at a concentration of from 7.5% to 12%. The addition of ammonia liquor to the cresol solution increased the rate of separation. The addition of ammonium hydroxide, C. P. increased the rate of separation to a slight extent. I have discovered that phenols in general are beneficial in the above formula, but of the phenols, cresol is outstanding in its efficiency. In Formula 2, when the sodium tallow soap percentage was increased to 20% and the tri-sodium phosphate was increased to as high as 10%, there was no increase in efficiency, and when the soap alone was used there was practically no dehydrating action and the same was true when trisodium phosphate was used. When the trisodium phosphate was used to the extent of 10% there was actually less water dehydrated than when .35% was used. The results obtained with Formula 2 indicate that the materials in Formula 1, which are actually acting as demulsifying or dehydrating reagents, are soap and trisodium phosphate, and that sodium carbonate and starch make no material difference in the efficiency of the compound from the point of view of dehydrating, although the same seem to have beneficial results in the wash or scrub boxes and concentrating systems of the gas system. In order to check this as respects dehydrating, compounds consisting of soap alone, soap plus trisodium phosphate, soap plus trisodium phosphate with the addition of sodium carbonate and with the addition of starch were tried, without any increase in the efficiency after the addition of either sodium carbonate or the starch or both of these materials.

The alkalinity of the water from the overflow after separation, when the process was working at high efficiency, was .366 gram per 100 cc. (Alkalinity expressed in grams of sodium hydroxide.) When the process was working at less efficiency, the alkalinity of the water was .284 gram per 100 cc. expressed in grams of sodium hydroxide. (Whenever alkalinity is herein referred to it is on this basis.) The temperature of the solution was 125° F. When the highest efficiency was obtained above, the solution of Formula 1 introduced into the tar emulsion was a solution of 3% of the detergent composition and 97% water.

The analysis of the liquids issuing from the machine through pipe 19 after treating the tar emulsion showed that there was about one-half of the detergent composition present. When the low efficiency figures were obtained, instead of 3% of the detergent composition being present, 2.8% was used and analysis of the solution issuing from the machine through pipe 19 after treatment with the tar emulsion showed that there was 1.92% of the detergent composition present. In other words, there was not efficient dehydration present to dilute the solution. When the machine and process were working at high efficiency, the alkalinity of the water issuing from pipe 19 was equivalent to .366 gram sodium hydroxide (NaOH) per 100 cc. and when low efficiency obtained, the alkalinity of said water was equivalent to .284 gram of sodium hydroxide. (The alkalinity is here expressed in grams of sodium hydroxide per 100 cc. and whenever alkalinity is herein referred to, it is on this basis.) The above figures indicate that there is a very narrow margin between the alkalinity of the said water when operating at high efficiency and when operating at poor efficiency.

I find that the degree of alkalinity obtaining for the alkaline reagent or solution before being added to the tar emulsion under actual plant operations, when working properly, is equivalent to about 0.432 gram sodium hydroxide (NaOH) per 100 cc. I have made a solution having an alkalinity of 0.160 gram and obtained as good results as is obtained at 0.432 gram. I have gone to as high as 1.00 gram alkalinity without any noticeable advantage over 0.432 gram. This would seem to indicate that it is not the degree of alkalinity which is critical, but rather, it is the type of alkalinity which is the important factor. The ammonia liquor added to the solution is very important, the same being the by-product in the manufacture of coal gas, as above explained. I have found that pure ammonia is not nearly as beneficial as the ammonia liquors.

I have also found that tri-ethanolamine with soap and ammoniacal liquors works satisfactorily, but not as efficiently as the trisodium phosphate soap and ammoniacal liquor combination. Sodium hydroxide, according to the results which I have obtained, does not serve as a satisfactory alkali producing agent and this, according to my best interpretation of the results, is due to the fact that it increases too greatly the specific gravity of the resulting mixture. It will be understood that such increase of specific gravity affects the water, and, therefore, there is not the tendency for the water to separate from the tar emulsion. In other words, there is a bringing of the water solution to too nearly the specific gravity of the tar emulsion. It seems that the chemicals operate to break down the surface tension of the tar emulsion. The chemical effects seem to extend not only to the cohesiveness, but also to the adhesive forces within the tar proper. I find that without chemical action, reliance cannot well be had upon violent mechanical agitation action. For mechanical separation without the use of any chemicals it would be best to apply the agitation when the emulsion is at a temperature of about 70° F. But this is below the temperature at which the emulsion is formed, and, therefore, a cooling process would be required. At such low temperature the tar emulsion is so viscous that it is impractical to be handled by ordinary pumping equipment of present common design. When the emulsion is treated with the chemicals, the lower limit for the efficiency of the chemicals is about 90° F.

Since the violent mechanical agitation tends to break up the water globules entrapped in the tar phase into much finer globules of water, to such an extent that there was not enough volume in each droplet to provide for their being expelled and caused to float to the top of the emulsion, there would seem to be the explanation of why mechanical separating devices, involving violent agitation, were not successful when applied to the tar emulsion in question.

The effectiveness of the falling of the small bodies or gravel seems to be that it is slow enough in its action to allow the formation by coalescence of the globules of water of sufficient size to rise to the top—the water, it being understood, is of less specific gravity than the tar when it is collected by the gravel to form globules of sufficient volume to rise to the top.

The chemicals seem to alter the adhesive force of the emulsion for all surfaces. For instance, the alkaline reagent of my invention, which is added, destroys the adhesive force of the emulsion for the sides of the drum, for the gravel or small bodies and for the water that is contained within the globules. With the emulsion thus affected chemically, the particles of gravel or small bodies have a stronger attraction for the water than they have for the tar, and as an individual body of gravel sinks through the body, it apparently performs two functions. (1) it intermixes the solution and the tar emulsion by carrying the alkaline solution into the tar emulsion and (2) it collects on its surface the released water particles from the tar and thus aids their coalescence to form a drop of water of sufficient volume to float to the top.

A microscopic study of the chemical action in dehydrating with the alkaline reagents of my invention is most interesting. If a standard microscopic study is prepared, with a small portion of the emulsion, the emulsion will have the appearance of a number of small droplets of tar with water entrapped. (As shown in Fig. 7.) If, with the use of an eye dropper, a very small quantity, such as a drop or two of the alkaline reagent of Formula 1, 2, or 3 of my invention is added to the emulsion, instantly the tar forms into a mass, with the water surrounding the same, so that it now appears as is shown in Fig. 8. In other words, the continuous phase has been changed from a tar phase to a water phase.

If, to a second supply having the tar emulsion thereon, as in Fig. 7, a small quantity of sodium hydroxide is similarly added, the tar emulsion has the appearance as shown in Fig. 9. Here it will be noted that the continuous phase has been changed from tar to water, but there is not the coalescence of the water, but rather, there resulted, a number of small droplets of tar surrounded by water. Manifestly, such action does not provide for nearly as rapid a separation of the water from the tar as in the case of Fig. 8, where the water collects into a larger body and upon contact with one of the falling bodies promptly leaves the tar and clings to the body to coalesce with other beads of water thereon to form a droplet of water of a necessary volume to readily float to the top.

In Fig. 10 the drum is of rectangular form cross-sectionally considered—the sides 95 serving to lift the contents in place of the flanges 22, Fig. 4.

It is manifest that the treatment involving my invention avoids the use of high heat, so that it has the advantage of not driving off the lighter oils of the emulsion. I thus retain all these in conjunction with the tar, so that the heat value of the resultant product is greatly enhanced. The tar product resulting from my invention with the oils retained when dried has a B. t. u. value of about 130,000 units per gallon.

Another advantage of my process is that it avoids the throwing off of obnoxious gases into the surrounding atmosphere, which would result if the emulsion is subjected to what is called the heat treatment, i. e., heating to above 212° F. This becomes a very important factor, since otherwise the plant might be condemned as a nuisance in the residential section, on account of the pungent odors resulting.

Thus the operating temperature of my process is less than the boiling point of water. In view of the fact that such operating temperature is not high enough for evaporation of the water from the tar, and in view of the fact that I do not employ an air current passing through the apparatus to carry away the water, my dehydration process described may be referred to as a process of deliquidization. This deliquidization at atmospheric water temperatures by the use of an alkaline reagent not only prevents the throwing off of obnoxious odors, but provides a tar product which is substantially dehydrated,— by "atmospheric water temperatures" I mean a pressure and temperature at which the water remains liquid.

Obviously, changes may be made in the forms, dimensions and arrangement of the parts of my invention, without departing from the principle thereof, the above setting forth only preferred forms of embodiment.

I claim:

1. The process of dehydrating a tar emulsion comprising adding a reagent characterized by having an alkalinity of the type produced by a soap of relatively high titer and tri-sodium phosphate at a temperature of 90° F. to 200° F.; and cascading through said mixture at atmospheric pressure small bodies having an attraction for water.

2. The process of dehydrating a tar emulsion comprising adding a reagent characterized by having an alkalinity of the type produced by a soap of relatively high titer and tri-sodium phosphate to a tar emulsion having the tar substantially in continuous phase and a relatively high water content, to form a mixture; cascading small bodies through said mixture, to dehydrate to about 25% water content; allowing an additional 10% of separation by gravity to provide tar of about 15% water content; heating such 15% tar in a closed vessel to about 180° F.; and allowing a further additional 10% of water separation by gravity to provide substantially a 5% water content tar.

3. The process of dehydrating a tar emulsion comprising adding an alkaline reagent of a lesser specific gravity than the tar emulsion and characterized by having an alkalinity equivalent to 0.1 gram to 1.0 gram (inclusive) sodium hydroxide per 100 cc. to a tar emulsion; and intermixing the alkaline reagent with and carrying the same through the tar emulsion by cascading a plurality of small bodies through the emulsion.

WALTER R. ALEXANDER.